Dec. 13, 1955  B. K. ASDELL  2,726,813
CLAY COMMINUTION METHOD
Filed Oct. 30, 1951  15 Sheets-Sheet 1

FIG. 1.

INVENTOR
BERNARD K. ASDELL

Dec. 13, 1955   B. K. ASDELL   2,726,813
CLAY COMMINUTION METHOD
Filed Oct. 30, 1951   15 Sheets-Sheet 2

FIG. 2.

INVENTOR.
BERNARD K. ASDELL

Dec. 13, 1955  B. K. ASDELL  2,726,813
CLAY COMMINUTION METHOD
Filed Oct. 30, 1951  15 Sheets-Sheet 5

FIG. 5.

INVENTOR.
BERNARD K. ASDELL
BY Hooper, Leonard & Glenn
his attorneys

United States Patent Office 2,726,813
Patented Dec. 13, 1955

2,726,813

CLAY COMMINUTION METHOD

Bernard K. Asdell, McIntyre, Ga., assignor, by mesne assignments, to Minerals & Chemicals Corporation of America, Metuchen, N. J., a corporation of Maryland Application October 30, 1951, Serial No. 253,924

17 Claims. (Cl. 241—5)

This invention relates to the treatment of clay and particularly to a method of treating kaolin to improve its properties as a pigment. Kaolin is an aluminum silicate material resulting from the weathering and degradation of aluminous materials, especially feldspar and mica. It occurs in nature in two types of deposits, primary deposits which are deposits of kaolin formed in situ, and secondary deposits, which are deposits of kaolin which have been transported from the place of formation. Both types of deposits contain kaolin particles which vary from large to small sizes in practically every deposit. In addition to particle size variation in the kaolin itself there are admixed with the kaolin varying amounts of impurities and non-kaolin minerals. The particle size variation within the naturally occurring kaolins and the non-kaolin impurities affects the use to which the naturally occurring clay can be put.

One of the principal uses to which kaolin has been put is the manufacture of pigments for use in paper coating. Kaolin is the principal pigment in most modern paper coatings. However, native clays or raw clays are not acceptable to the paper trade for coating purposes, either as mined from the ground or after the non-kaolin materials alone have been removed. Kaolin from which the non-kaolin impurities alone have been removed does not have the necessary gloss and brightness, both of which are extremely important to paper coaters.

In the early '30's it was discovered that the gloss and the brightness of a paper coating made from kaolin were related to the particle size of the kaolin used in the coating. It was found that the particles below 2 microns in equivalent spherical diameter are the ones which impart high gloss and brightness to a paper coating and it was proposed that the kaolin minerals as they occurred in nature be subjected to a fractionation treatment to separate the particles below 2 microns from the larger gross particles which were then discarded or used for other purposes. This discovery is the subject of Maloney Patent No. 2,158,987, issued May 16, 1939. It has since been found that the particles below 2 microns in equivalent spherical diameter are essentially plate-like in character, whereas those which exceed 2 microns in equivalent spherical diameter are essentially stack-like aggregates of plate-like particles tightly cemented together. These stack-like aggregates are not readily broken apart by ordinary means.

When clays were fractionated to recover the portion below 2 microns in particle size as proposed by the Maloney patent there was recovered from the naturally occurring kaolin only about ½ to ⅔ of the kaolin minerals. The remainder consisted principally of the larger stack-like particles. There was no adequate market for this reject material and it sometimes had to be discarded. This practice is a considerable economic waste in material and handling costs and increases the cost of production of the resulting finer particle size clays.

Moreover, clay which is processed by separating a fine particle fraction from a coarse particle fraction by gravitational or centrifugal methods contains an increased proportion of ultra-fine or colloidal material by reason of the fact that all of such material occurring in the natural clay is concentrated in the fine fraction. The Maloney patent teaches that a certain amount of colloidal material is desirable but that an excessive amount of colloidal material reduces the hiding power. Practical experience in the art has confirmed this and as a result it has been proposed to first make the fractionation taught by Maloney and then to make a second fractionation to reduce the amount of colloidal material. This second fractionation adds materially to the expense of producing kaolin pigments where a low percentage of colloidal material is necessary or desirable.

In order to increase the yield of particles 2 microns and smaller in equivalent spherical diameter, and thus reduce this loss of material and handling costs, it has heretofore been proposed to grind the discard material or the entire material before fractionation in ball mills, roller mills or by other means of mechanical attrition. However, these processes have not been successful for various reasons, among which are the excessive amount of energy required and the extremely small yield of finer particles which results. Generally, grinding such as that proposed by the prior art results in flattening or crushing the stack-like particles but does not result in defoliation of the stack or the production of any substantial amount of material below 2 microns in equivalent spherical diameter. The result is that whatever particles are reduced in size are not flat, plate-like particles but are rather small, irregular "chunks." These irregular "chunky" particles are generally larger than 2 microns in equivalent spherical diameter and do not have the desirable properties of the natural occurring, plate-like particles in sizes below 2 microns.

I have found that kaolin may be treated by certain process steps, later to be described, to produce a product substantially all of whose particles are less than 10 microns in equivalent spherical diameter and at least 75% by weight of which consists of particles less than 2 microns in equivalent spherical diameter. I have found that by following these process steps none of the kaolin need be discarded and that the relative amount of colloidal material in the final product is not substantially increased over that which naturally occurs in the kaolin.

I have discovered a method of treating kaolin to improve its properties as a pigment which comprises generally the steps of supplying a feed material consisting essentially of kaolin of such moisture content that the mass is in a free-flowing state, a substantial percentage of the feed material consisting of particles in the form of stack-like assemblies of crystalline plates, reducing at least some of these stacks to their plate-like components by forming a suspension of the feed material in a gaseous stream, carrying the particles in suspension at high velocity and causing substantially each particle to enter into one or more collisions, continually collecting the larger particles which remain after the collisions and subjecting them to further collisions in a gaseous stream and continuing in such fashion until substantially all of the clay particles are less than 10 microns in equivalent spherical diameter, and at least 75% by weight of the clay consists of particles less than 2 microns in equivalent spherical diameter, said particles having a plate-like form.

Preferably the feed material is essentially freed from non-kaolin impurities and in the pulverulent state and the collisions are kaolin particle against kaolin particle. However, I have used naturally occurring kaolin and kaolin in small lumps with success in my process and have caused kaolin particles to collide with a target instead of against one another to achieve the results of my invention. I prefer to use compressed air as the gaseous stream in the practice of my invention but any other suitable gas may be used, e. g., superheated steam.

I have found that if the steps of the method described above are followed that the entire mass of clay including the portion above 2 microns equivalent spherical diameter which has heretofore been discarded as useless may be recovered as material suitable for paper-coating pigments. In order to show the effect of my treatment upon such oversized clays certain experiments were conducted. The results of these experiments are tabulated herebelow.

EXAMPLE

Figure 1:
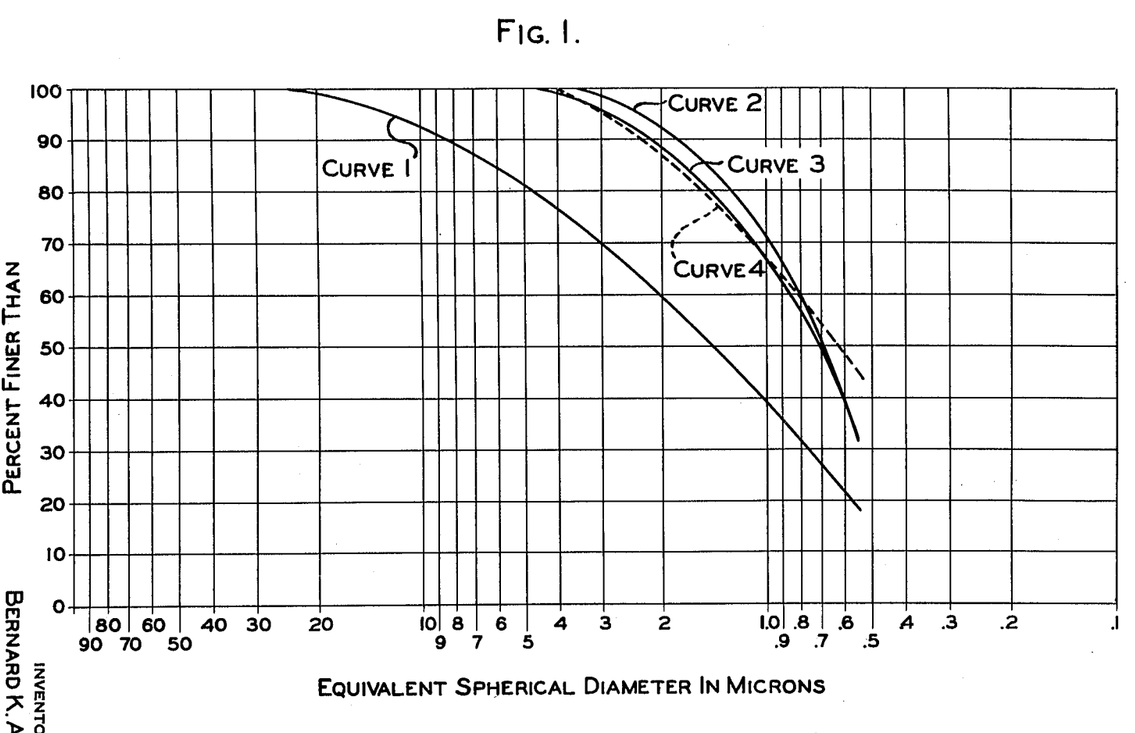

A crude kaolinitic clay from Washington County, Georgia, was water-washed to remove essentially all of the non-kaolin impurities while retaining the maximum proportion of kaolin. This practice is old and is designed to remove non-kaolin impurities such as sand and mica. The clay, after such a refining treatment, is suitable for a variety of uses but is not generally suitable for paper coating purposes. The particle size distribution of this water-washed clay, as measured by sedimentary methods, is shown in Figure 1 as "Curve 1" and the clay is designated by the numeral 1 in the tabulation of properties which will follow.

The clay thus prepared was treated to reduce the particle size in a Blaw-Knox fluid energy pulverizer using compressed air as the source of energy. The air jets had a velocity exceeding that of sound, and the entrained clay particles were accelerated to very high velocities by these jets. The mill was so arranged that two such high velocity jets were spaced two inches apart and so aimed that the air streams impinged directly upon each other. The clay particles entrained in the air streams were thus reduced to finer size while maintaining the generally plate-like form of the naturally occurring particles of similar finer sizes as shown by examination with an electron microscope. The particle size, as measured by sedimentation methods, of four successive lots produced from the clay above referred to as 1 is indicated by curves 2 and 3 of Figure 1. Curve 2 is an average of the data obtained on samples of two individual lots in which the compressed air used was at 102–110 p. s. i. g. and was superheated to a temperature ranging from 720° F. to 840° F. The feed rate of clay and compressed air were so adjusted as to give a ratio of about 150 cubic feet of free air per pound of clay. Curve 3 is an average of the data obtained on samples of two other individual lots in which the compressed air used was again at 102–110 p. s. i. g. but was not superheated, and the feed rates were so adjusted as to give a ratio of about 265 cubic feet of free air per pound of clay. In the succeeding tabulation of properties the designation 2 refers to the average of data on the same lots using superheated air whose particle size curve is marked 2 and the designation 3 indicates the average of data on the same lots whose particle size curve is marked 3 in Figure 1.

Another portion of the water-washed clay referred to above as 1 was fractionated by the process of U. S. Patent No. 2,158,987 to produce a product having a particle size equivalent to that of the ground products referred to above as 2 and 3, as determined by empirical centrifugal determinations. The particle size distribution of this product is illustrated by the broken line curve marked 4 of Figure 1 and in the tabulation below the properties of this product are listed under the designation 4.

The tabulation below summarizes tests to determine the properties of the clays. The gloss data given consists of measurements made upon coated sheets of paper prepared by using a standardized laboratory formula consisting of 13 pounds of casein per 100 pounds of clay. Gloss measurements were made on the coated sheets before and after calendering, using an Ingersoll glarimeter.

The brightness values given are the results of determinations of diffuse reflectance values at the wavelength of 458 millimicrons. The measurements were made upon the clay samples themselves and upon samples of coated paper before and after calendering.

The disintegration test is a measure of agglomerated or other oversized material which, if present in excessive quantities, renders a clay unsuitable for paper coating by many commercial processes by giving rise to defects in the surface of the finished sheet such as a tendency to dust upon calendering, etc. A frequently used criterion is that clays giving disintegration values in excess of 1.0 ml. are unsatisfactory for coating purposes.

The kerosene settling test is made by dispersing 24 grams of clay in 300 ml. of kerosene in a pebble-mill and observing the settling characteristics of the resulting suspension. The quantity of clear supernatant kerosene after 1 hour settling is an indication of the suitability of clay for use in certain types of printing inks and similar coating compositions. Values in excess of about 15 ml. are generally indicative of clays which will cause trouble due to the formation of a sludge in the fountain of the printing press.

The "centrifuge residue" is an empirical measure used to control clay fractionation procedures. This data is included in the tabulation to show the close similarity between clay 4, prepared by fractionation processes of the prior art and clays 2 and 3 prepared by the process of the invention.

*Table*

| | 1 | 2 | 3 | 4 |
|---|---|---|---|---|
| Gloss, uncalendered___________percent__ | 30.9 | 53.9 | 49.2 | 45.3 |
| Gloss, calendered______________do____ | 74.3 | 87.0 | 87.4 | 86.6 |
| Brightness of clay___________________ | 82.4 | 83.2 | 84.0 | 85.0 |
| Brightness of coated sheet: | | | | |
|   Uncalendered___________________ | 75.7 | 78.8 | 79.3 | 77.9 |
|   Calendered_____________________ | 73.4 | 76.5 | 77.4 | 76.7 |
| Disintegration test, 10 min___milliliters__ | 7.4 | 0.14 | 0.15 | 0.27 |
| Kerosene settling, 1 hr_________do____ | 74 | 7 | 9 | 7 |
| Centrifuge residue_____________do____ | 1.00 | 0.33 | 0.35 | 0.38 |

Figure 2:
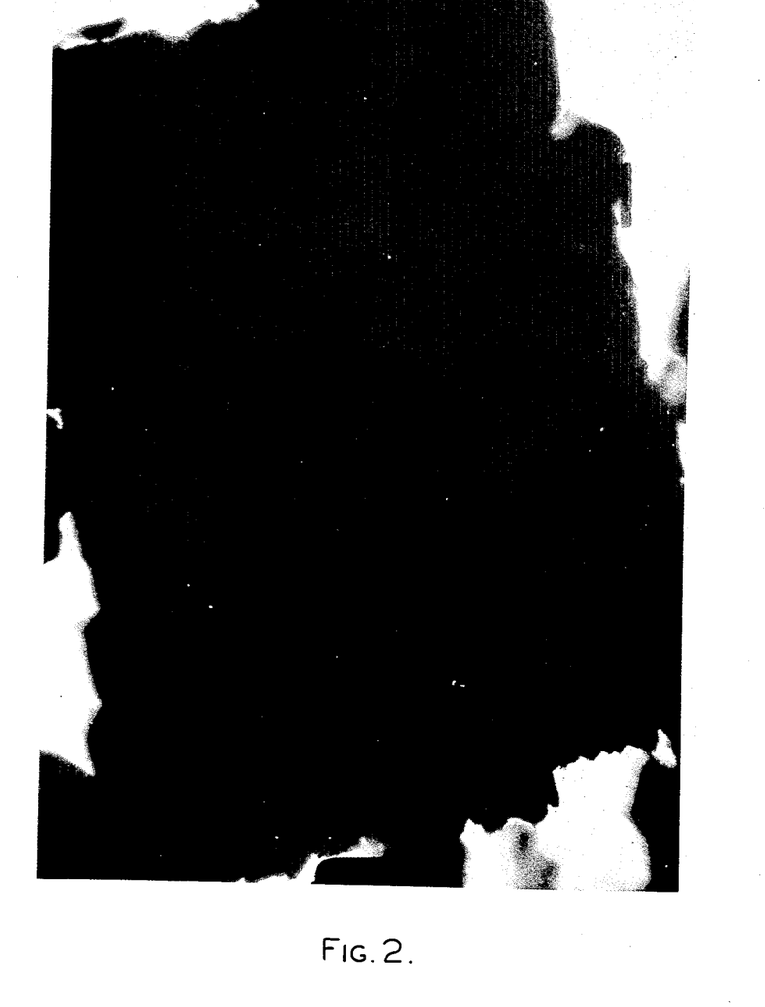
Figure 3:
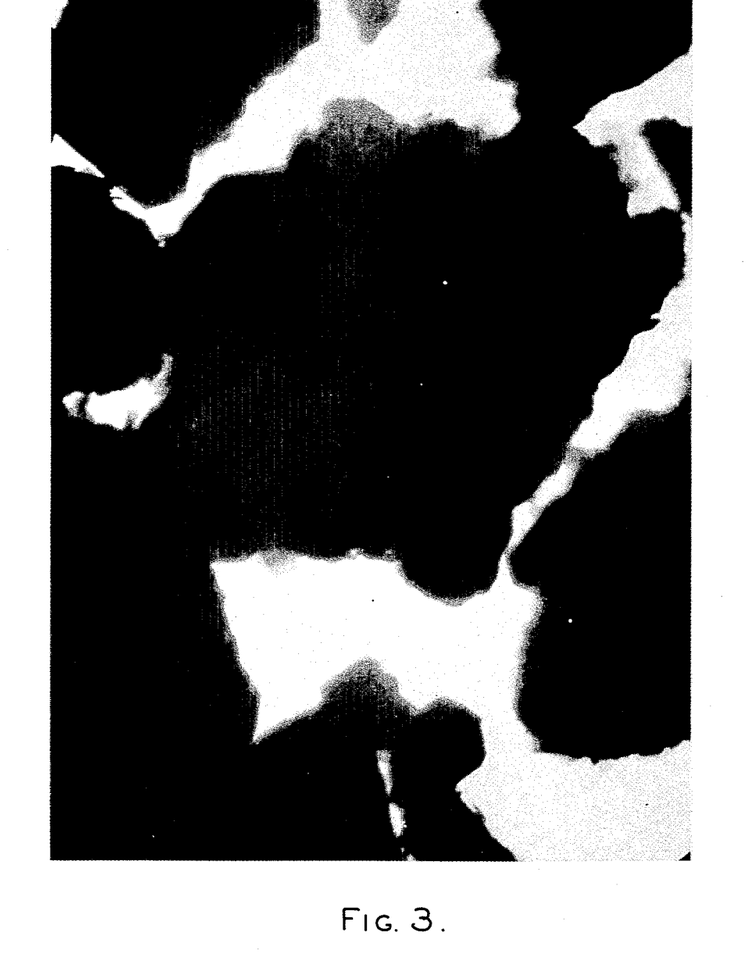
Figure 4:
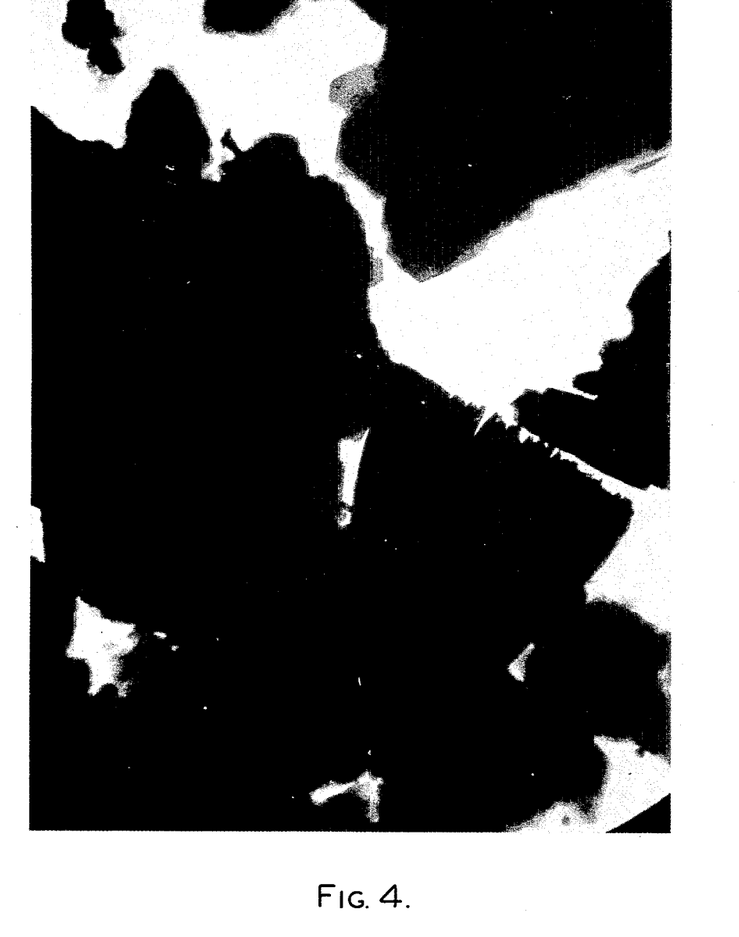
Figure 5:
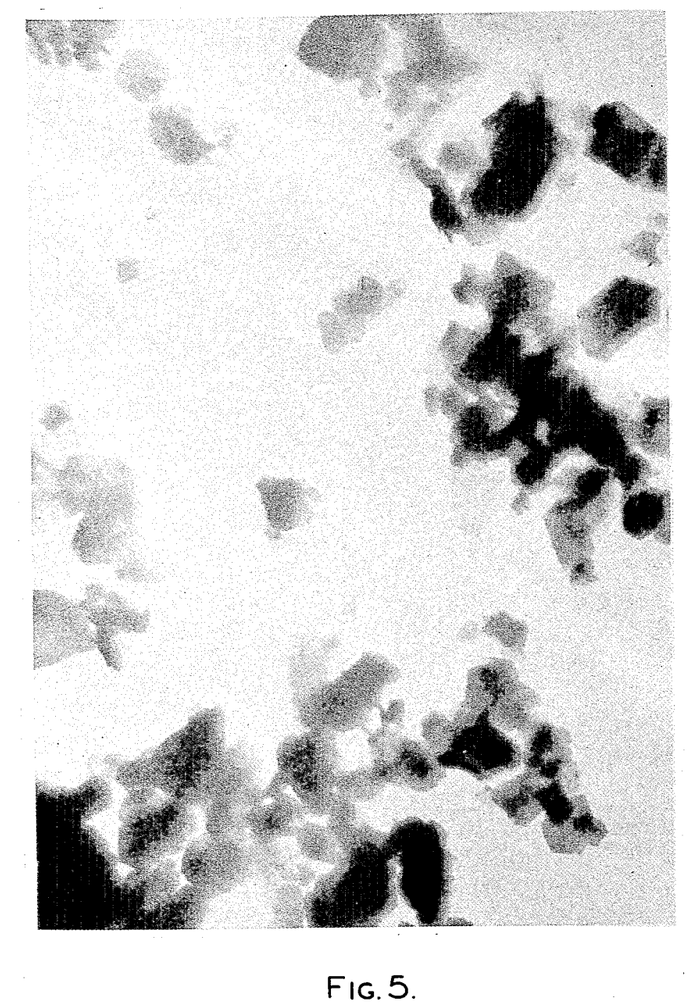
Figure 6:
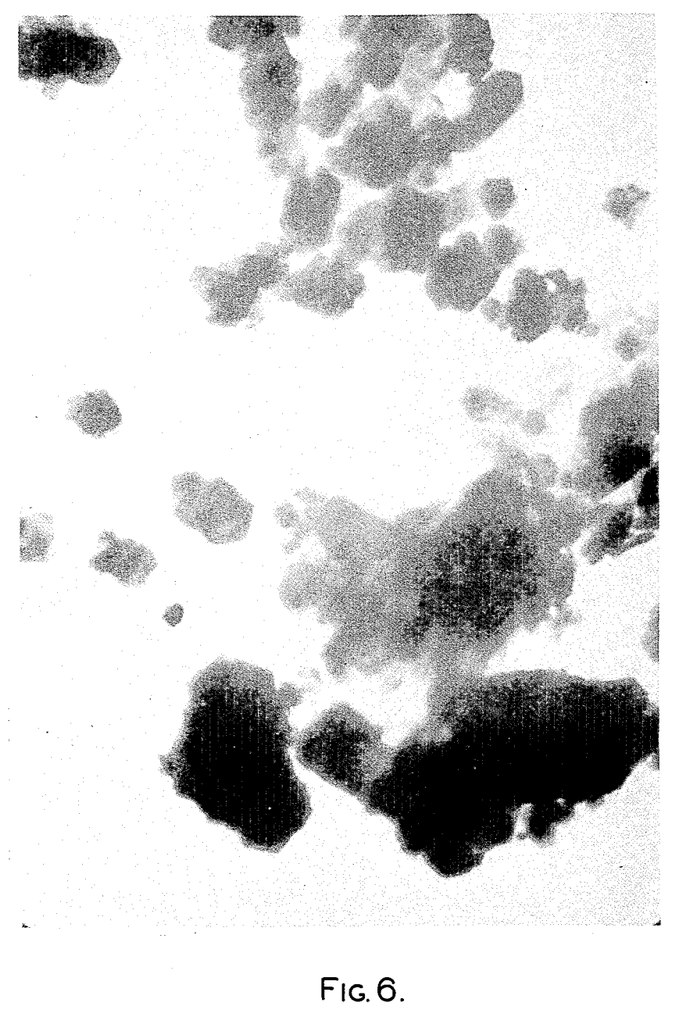
Figure 7:
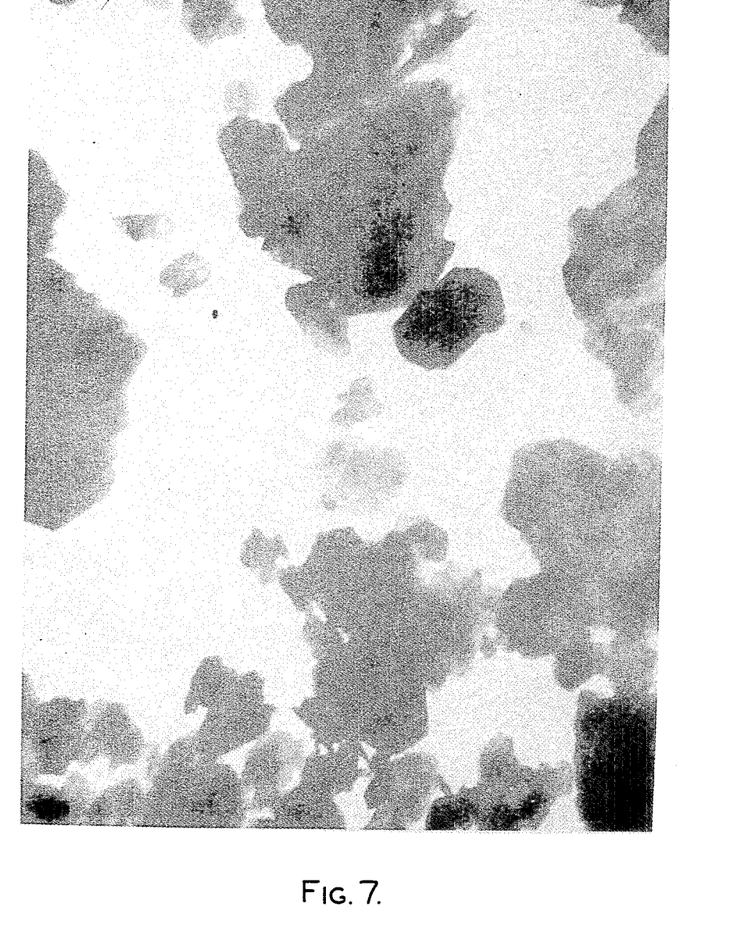
Figure 8:
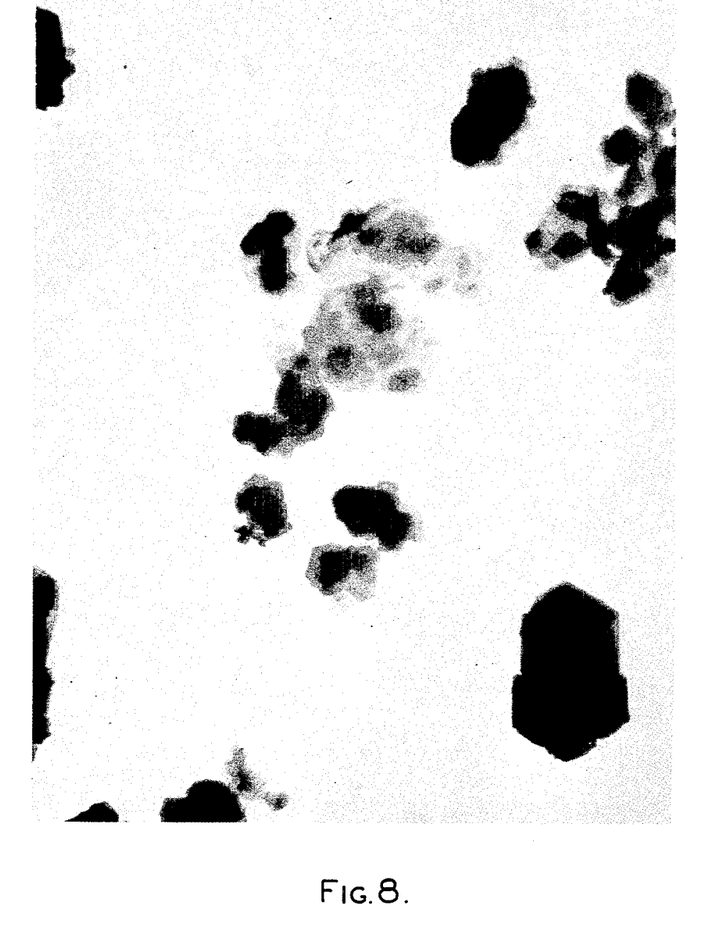
Figure 9:
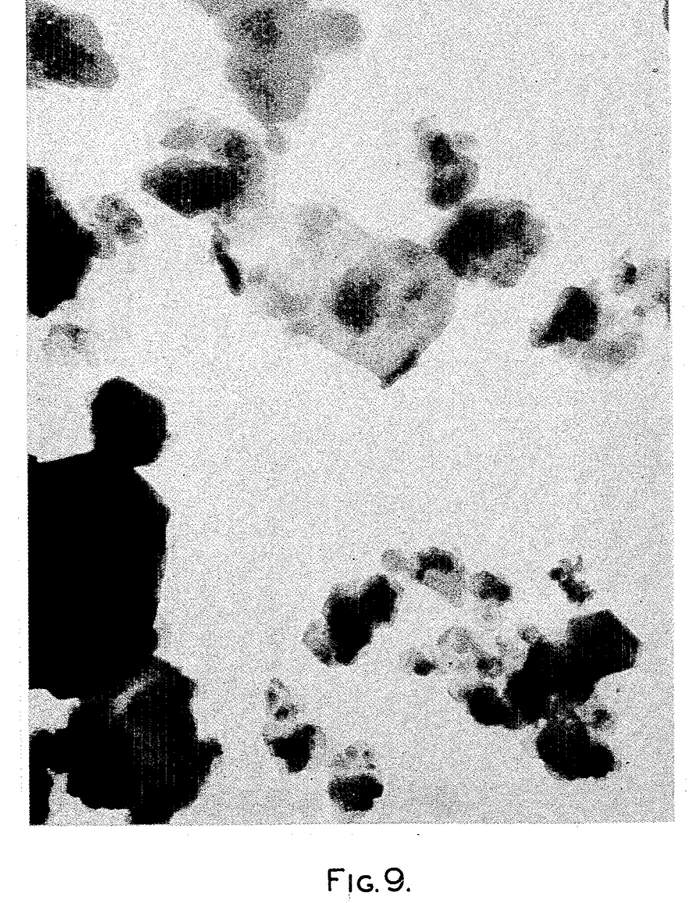
Figure 10:
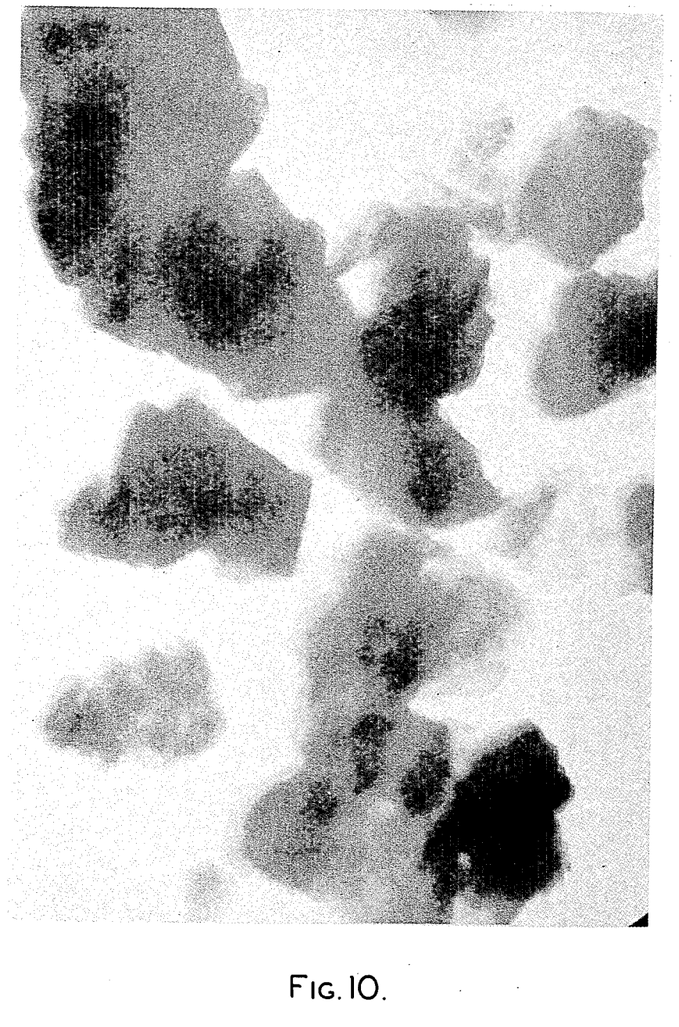
Figure 11:
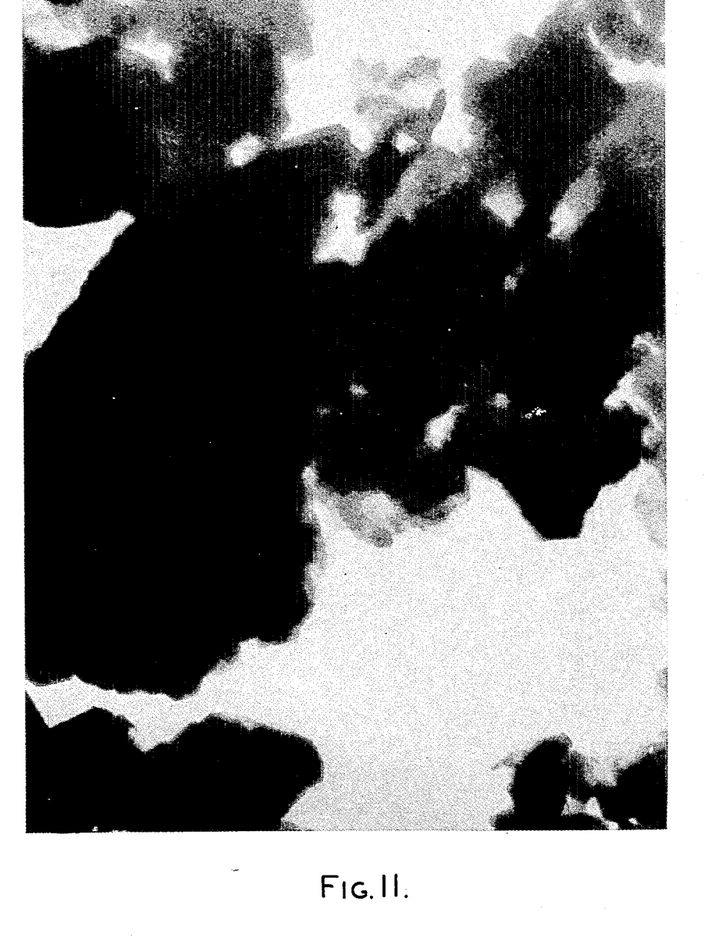
Figure 12:
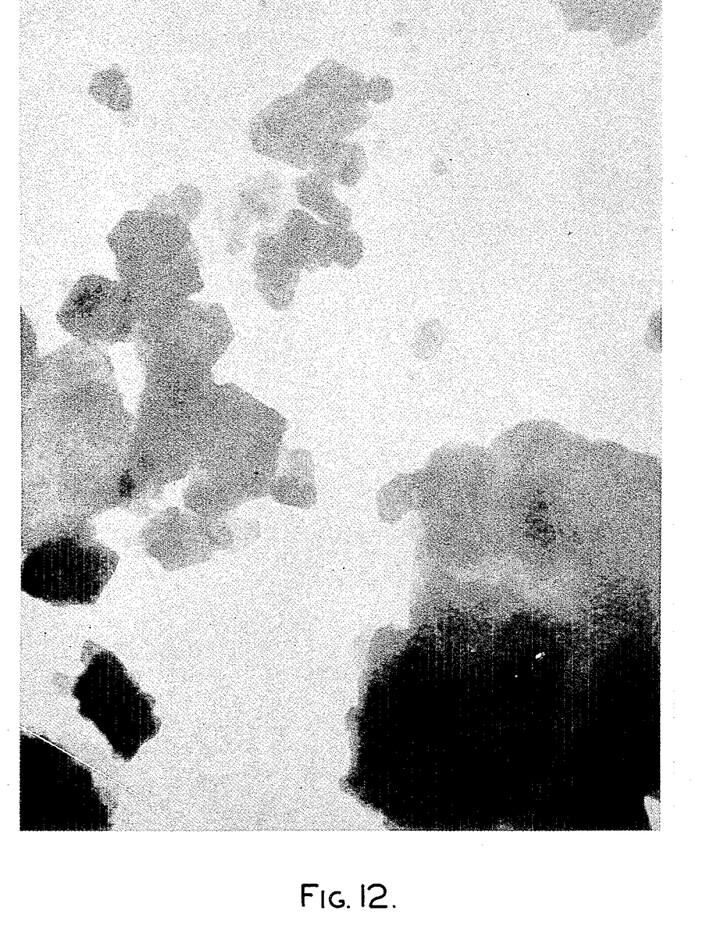
Figure 13:
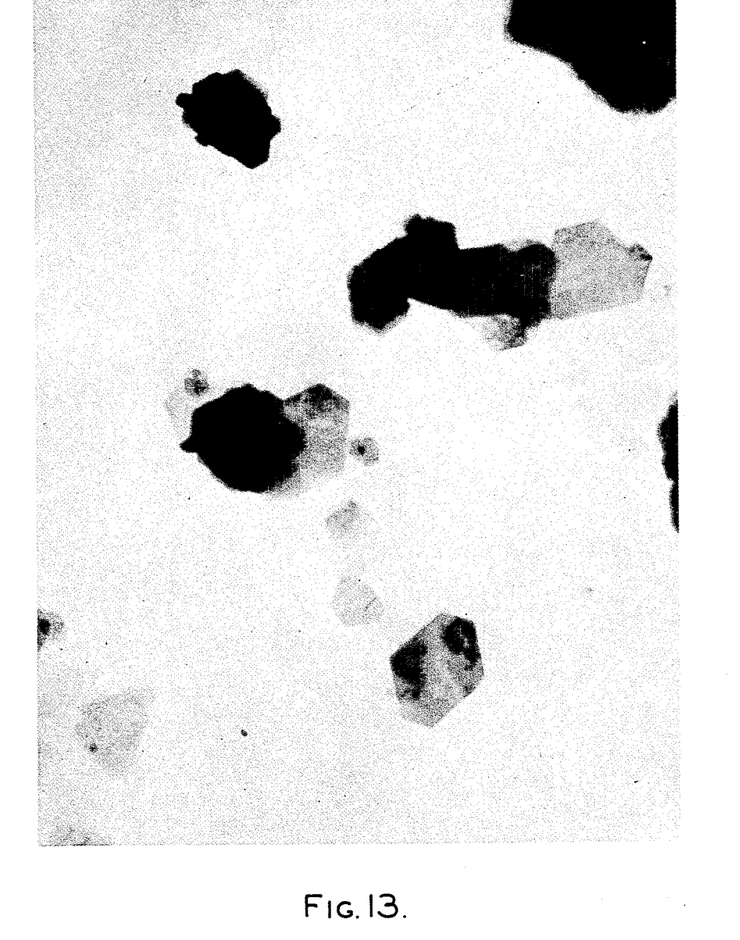
Figure 14:
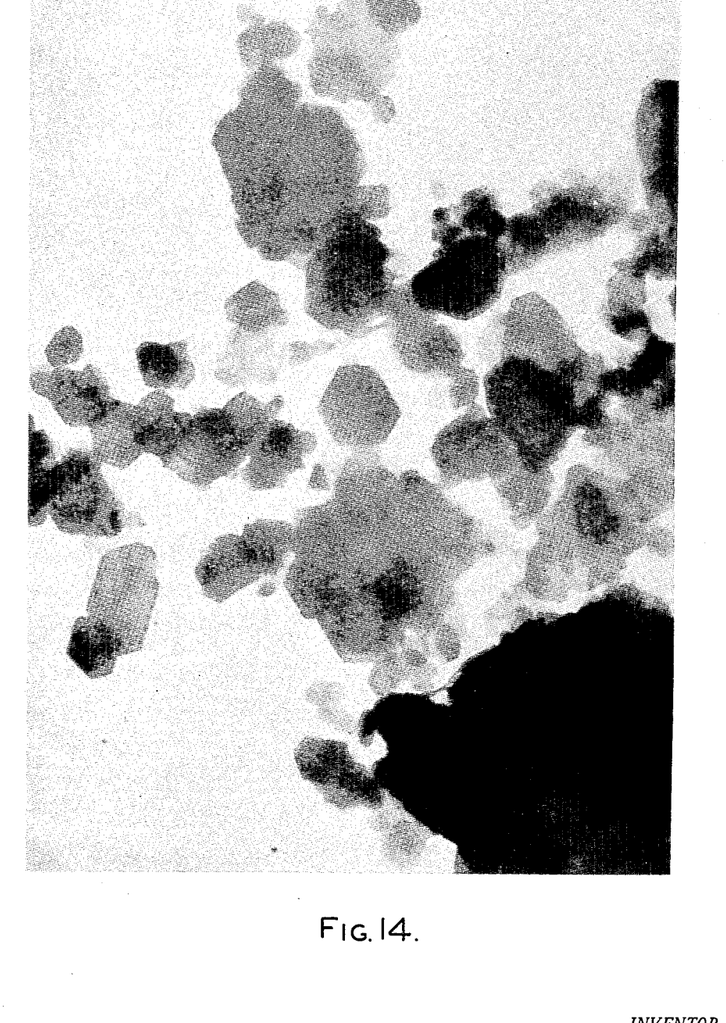
Figure 15:
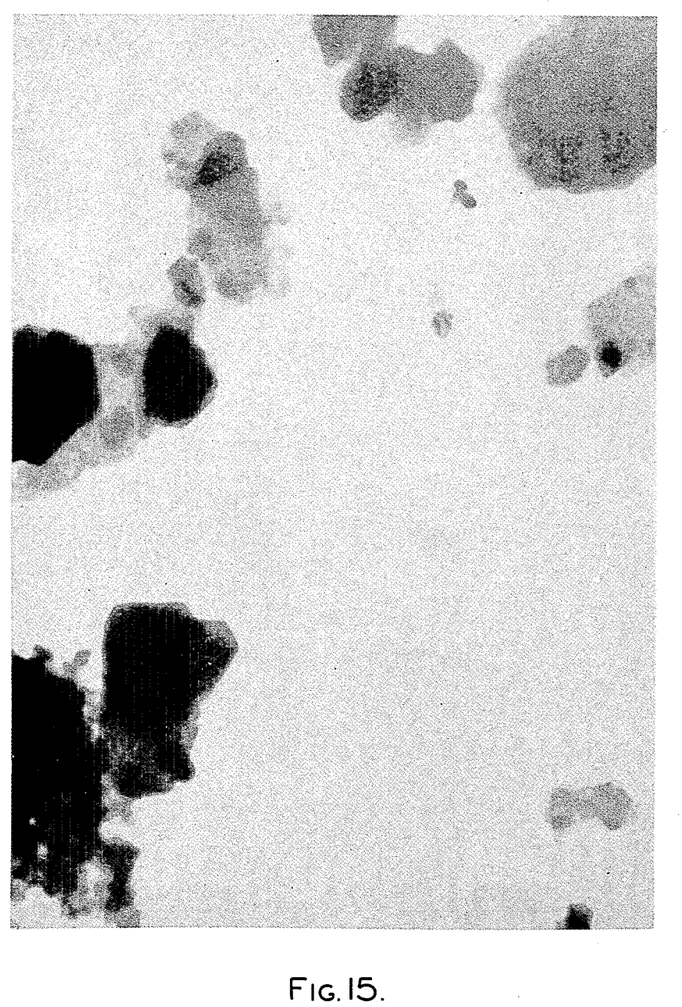

Electron micrographs were made of the starting clay (clay 1), the clay prepared by the usual sedimentation process (clay 4) and the clay processed by the present invention (clays 2 and 3). Figures 2, 3 and 4 are typical electron micrographs (magnified 20,000 times) of the water-washed clay which was the starting material for both the sedimentation process and the process of my invention. Figures 5, 6 and 7 show the particles of clay resulting from processing the water-washed clay (clay 1) by the process of my invention using superheated air. These micrographs also show the particles magnified 20,000 times. Figures 8, 9, 10 and 11 show particles of clay (Figures 8, 10 and 11 magnified 20,000 times, Figure 9 magnified 31,500 times) resulting from processing the water-washed clay by the process of my invention with compressed air and without the use of superheating. Figures 12, 13, 14 and 15 (magnification 31,500 times) show the particles of clay resulting from the usual sedimentation process.

Comparison of Figures 5 through 11 with Figures 2 through 4 shows that a substantial reduction in particle size has taken place by following my process. A further comparison of Figures 5 through 11 with Figures 12 through 15 shows that the small particles of clay produced by following my invention are similar in size and shape to the fraction of natural fine clay which may be produced by sedimenting out the larger particles from the water-washed clay.

Comparison of the properties of the clays produced by following the process of my invention with like properties of the fine particle clays produced by sedimentation shows that the clays of my invention are equal to or superior to the corresponding natural fine fraction obtained by sedimentation. In this connection it is important to note that in order to obtain these results by sedimentation between ½ and ⅓ of the total clay must be discarded whereas the results by the process of my invention include substantially all of the clay without any need for loss through discard. It should be also noted that a comparison of curve 4 with curves 2 and 3 shows the increased concentration of ultra-fine and colloidal material in the material prepared by sedimentation as compared with the products produced by my process.

The process of my invention may be practiced by various combinations of equipment so long as the process steps are followed. For example, water-washed kaolin may be passed through the Blaw-Knox mill mentioned under the example above, the large particles collected and returned for further treatment as a part of the feed to the same mill or the large particles remaining may be passed to a second mill and recirculated there for further treatment after which they may be added to the product from the first mill.

While I have described certain preferred practices of my invention, it will be understood that it may be otherwise embodied within the scope of the following claims.

I claim:

1. The method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components by forming a suspension of the feed material in a gaseous stream, moving the stream at high velocity and causing a substantial number of the particles to enter into one or more collisions, collecting the larger particles remaining after the collisions and subjecting them to further collisions in a gaseous stream and continuing in such fashion until substantially all of the clay particles are less than 10 microns in equivalent spherical daimeter and at least 75%, by weight, of the clay consists of particles less than 2 microns in equivalent spherical diameter, said particles having a substantially plate-like form.

2. The method of treating kaolin to improve its properties as a pigment, which comprises supplying a feed material consisting essentially of kaolin from which substantially all of the non-kaolin impurities have been removed and of such moisture content that the individual particles are generally non-adherent, a substantial percentage of whose particles are stack-like assemblies of crystalline plates, separating at least some of the stacks into single plates by forming a suspension of the feed material in a gaseous stream, moving the stream at high velocity and causing a substantial number of the particles to enter into one or more collisions, continually collecting the larger particles remaining after the collisions and subjecting them to further collisions in a gaseous stream and continuing in such fashion until substantially all of the clay particles are less than 10 microns in equivalent spherical diameter and at least 75%, by weight, of the clay consists of particles less than 2 microns in equivalent spherical diameter, said particles having a substantially plate-like form.

3. The method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components by forming a suspension of the feed material in a gaseous stream, moving the stream carrying the particles in suspension at high velocity and causing substantially each particle to enter into one or more collisions, continually collecting the larger particles remaining after the collisions and subjecting them to further collisions in a gaseous stream and continuing in such fashion until substantially all of the clay particles are less than 10 microns in equivalent spherical diameter and at least 75%, by weight, of the clay consists of particles less than 2 microns in equivalent spherical diameter, said particles having a substantially plate-like form.

4. The method of treating kaolin to improve its properties as a pigment, which comprises supplying a feed material consisting of kaolin which has been bleached and water-washed and is of such low moisture content that the mass is in a free-flowing state, a substantial percentage of the feed material consisting of particles in the form of stack-like assemblies of crystalline plates, reducing at least some of the stacks to their plate-like components by forming a suspension of the feed material in a gaseous stream, moving the stream at high velocity and causing a substantial number of the particles to enter into one or more collisions, continually collecting the larger particles remaining after the collisions and subjecting them to further collisions in a gaseous stream and continuing in such fashion until substantially all of the clay particles are less than 10 microns in equivalent spherical diameter and at least 75%, by weight, of the clay consists of particles less than 2 microns in equivalent spherical diameter, said particles having a substantially plate-like form.

5. A method of treating kaolin to improve its properties as a pigment, which comprises supplying a feed material consisting essentially of kaolin of such moisture content that the mass is in a free-flowing pulverulent state, a substantial percentage of feed material consisting of particles in the form of stack-like assemblies of crystalline plates, reducing at least some of the stacks to their plate-like components by forming a suspension of the feed material in a gaseous stream, moving the stream at high velocity and causing a substantial number of the particles to enter into one or more collisions, continually collecting the larger particles remaining after the collisions and subjecting them to further collisions in a gaseous stream and continuing in such fashion until substantially all of the clay particles are less than 10 microns in equivalent spherical diameter and at least 75%, by weight, of the clay consists of particles less than 2 microns in equivalent spherical diameter, said particles having a substantially plate-like form.

6. A method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components and forming a suspension of the said material in a gaseous stream, moving the stream at high velocity and impinging the particles upon one another, collecting the larger remaining particles remaining after the impingement, subjecting them to further impingement in a gaseous stream and continuing in such fashion until substantially all of the clay particles are less than 10 microns in equivalent spherical diameter and at least 75%, by weight, of the clay consists of particles less than 2 microns in equivalent spherical diameter, said particles having a substantially plate-like form.

7. A method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components by forming a suspension of the feed material in a gaseous stream, moving the stream at high velocity and impinging the particles on a target, collecting the larger remaining particles remaining after the impingement, subjecting them to further impingement in a gaseous stream and continuing in such fashion until substantially all of the clay particles are less than 10 microns in equivalent spherical diameter and at least 75%, by weight, of the clay consists of particles less than 2 microns in equivalent spherical diameter, said particles having a substantially plate-like form.

8. The method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components by forming a suspension of the feed material in a gaseous stream, dividing the stream into two portions and moving said two portions at high velocity, directing the two portions into each other in opposed directions to cause the particles to impinge upon one another, collecting the larger particles remaining after the impingement, subjecting them to further impingement in opposed gaseous streams and continuing in such fashion until substantially all of the clay particles are less than 10 microns in equivalent spherical diameter and at least 75%, by weight, of the clay consists of particles less than 2 microns in equivalent spherical diameter, said particles having a substantially plate-like form.

9. The method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components by forming a suspension of the feed material in a stream of air, moving the stream at high velocity and causing a substantial number of the particles to enter into one or more collisions, collecting the larger particles remaining after the collisions and subjecting them to further collisions in a stream of air and continuing in such fashion until substantially all of the clay particles are less than 10 microns in equivalent spherical diameter and at least 75%, by weight, of the clay consists of particles less than 2 microns in equivalent spherical diameter, said particles having a substantially plate-like form.

10. The method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components by forming a suspension of the feed material in a stream of superheated steam, moving the stream at high velocity and causing a substantial number of the particles to enter into one or more collisions, collecting the larger particles remaining after the collisions and subjecting them to further collisions in a stream of superheated steam and continuing in such fashion until substantially all of the clay particles are less than 10 microns in equivalent spherical diameter and at least 75%, by weight, of the clay consists of particles less than 2 microns in equivalent spherical diameter, said particles having a substantially plate-like form.

11. The method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components by forming a suspension of the feed material in a gaseous stream, moving the stream at a velocity approaching the speed of sound and causing a substantial number of the particles to enter into one or more collisions, collecting the larger particles remaining after the collisions and subjecting them to further collisions in a gaseous stream and continuing in such fashion until substantially of the clay particles are less than 10 microns in equivalent spherical diameter and at least 75%, by weight, of the clay consists of particles less than 2 microns in equivalent spherical diameter, said particles having a substantially plate-like form.

12. The method of treating kaolin to improve its properties as a pigment, which comprises supplying a feed material consisting essentially of kaolin of such low moisture content that the mass is in a free-flowing pulverulent state, a substantial percentage of the feed material consisting of particles in the form of stack-like assemblies of crystalline plates so firmly adhering to one another that working between hard surfaces tends generally to reduce the stacks to irregular fragments, reducing at least some of the stacks to their plate-like components by forming a suspension of the feed material in a gaseous stream, moving the stream at high velocity and impinging the particles on each other, collecting the large remaining particles remaining after the impingement, subjecting them to further impingement in a gaseous stream and continuing in such fashion until substantially all of the clay particles are less than 10 microns in equivalent spherical diameter and at least 75%, by weight, of the clay, consists of particles less than 2 microns in equivalent spherical diameter, said particles having plate-like form.

13. The method of treating kaolin to improve its properties as a pigment, which comprises supplying a feed material consisting essentially of kaolin of such low moisture content that the mass is in a free-flowing pulverulent state, a substantial percentage of the feed material consisting of particles in the form of stack-like assemblies of crystalline plates so firmly adhering to one another that working between hard surfaces tends generally to reduce the stacks to irregular fragments, reducing at least some of the stacks to their plate-like components by forming a suspension of the feed material in a gaseous stream, moving the stream at high velocity and impinging the particles on a target, collecting the large remaining particles remaining after the impingement, subjecting them to further impingement in a gaseous stream and continuing in such fashion until substantially all of the kaolin particles are reduced to less than 10 microns in equivalent spherical diameter, at least about 75%, by weight, of which are plate-like in character and about 2 microns in equivalent spherical diameter.

14. The method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components by forming a suspension of the feed material in a gaseous stream, moving the stream at high velocity and causing a substantial number of the particles to enter into one or more collisions, collecting the larger particles remaining after the collisions, subjecting them to further collisions in a gaseous stream and continuing in such fashion until substantially all of the clay particles are less than 2 microns in equivalent spherical diameter.

15. The method of treating kaolin to improve its properties as a pigment, which comprises supplying a feed material consisting essentially of kaolin of such moisture content that the mass is in a free-flowing state, a substantial percentage of the feed material consisting of particles in the form of stack-like assemblies of crystalline plates, reducing at least some of the stacks to their plate-like components by forming a suspension of the feed material in a gaseous stream, moving the stream at high velocity and causing a substantial number of the particles to enter into one or more collisions, collecting the larger particles remaining after the collisions, subjecting them to further collisions in a gaseous stream and continuing in such fashion until substantially 90% of the clay particles are less than 2 microns in equivalent spherical diameter.

16. The method of treating kaolin to improve its properties as a pigment, which comprises supplying a feed material consisting essentially of water-washed and bleached kaolin of such moisture content that the mass is in a free-flowing pulverulent state, a substantial percentage of the feed material consisting of particles in the form of stack-like assemblies of crystalline plates, reducing at least some of the stacks to their plate-like components by forming a suspension of the feed material in a stream of air, moving the stream at velocities approaching the speed of sound and causing a substantial number of the particles to impinge upon one another, collecting the large particles remaining after the impingement, subjecting them to further collisions in a stream of air and continuing in such fashion until about 75%, by weight, of the clay consists of particles less than 2 microns in equivalent spherical diameter, said particles having a plate-like form.

17. The method of treating kaolin to improve its properties as a pigment, which comprises supplying a feed material consisting essentially of kaolin of such low moisture content that individual particles are generally non-adherent, a substantial percentage of whose particles are stack-like assemblies of crystalline plates so tightly adherent that fragmentation into irregular pieces occurs upon working the stacks under pressure between hard surfaces, separating at least some of the stacks into single plates by forming a suspension of the feed material in a gaseous stream, moving the stream at high velocity and impinging a substantial number of the particles against a surface, collecting the stacks remaining after the impingement, subjecting them to further impingement in a gaseous stream and continuing until substantially all of the clay particles are less than 10 microns in equivalent spherical diameter and at least 75%, by weight, of the clay consists of particles less than 2 microns in equivalent spherical diameter, said particles having a substantially plate-like form.

References Cited in the file of this patent

UNITED STATES PATENTS

| | | |
|---|---|---|
| 1,246,514 | Willoughby | Nov. 13, 1917 |
| 1,621,270 | Podszus | Mar. 15, 1927 |
| 2,158,987 | Maloney | May 16, 1939 |
| 2,315,084 | Chesler | Mar. 30, 1943 |
| 2,325,080 | Stephanoff | July 27, 1943 |
| 2,346,085 | Sawyer | Apr. 14, 1944 |